United States Patent [19]
Dekhtyar

[11] Patent Number: 5,878,766
[45] Date of Patent: Mar. 9, 1999

[54] PRESSURE COMPENSATED FLOW CONTROL VALVE

[75] Inventor: Iosif Dekhtyar, Vernon Hills, Ill.

[73] Assignee: Vickers, Incorporated, Maumee, Ohio

[21] Appl. No.: 954,522

[22] Filed: Oct. 20, 1997

Related U.S. Application Data

[60] Provisional application No. 60/056,817, Aug. 22, 1997.

[51] Int. Cl.$^6$ ................................................... G05D 7/01
[52] U.S. Cl. .............................................. 137/8; 137/501
[58] Field of Search .............................. 137/8, 501, 625.3

[56] References Cited

U.S. PATENT DOCUMENTS

| | | | |
|---|---|---|---|
| 3,085,590 | 4/1963 | McIlhenny | 137/501 |
| 3,344,805 | 10/1967 | Wapner | 137/501 |
| 3,880,476 | 4/1975 | Belart et al. | |
| 4,316,599 | 2/1982 | Bouvet et al. | |
| 4,548,383 | 10/1985 | Wolfges | |
| 4,630,640 | 12/1986 | DiBartolo | |
| 5,004,006 | 4/1991 | Jung | 137/501 |
| 5,014,747 | 5/1991 | Suzuki et al. | |
| 5,174,338 | 12/1992 | Yokota et al. | |
| 5,586,036 | 12/1996 | Barnes | 137/501 |

OTHER PUBLICATIONS

Specification Sheet—Vonberg Valve, Inc. 2600 Series.
Sun Specification Sheet referencing USPN 4,630,640.
Modular Controls—Division of Vickers Pressure Compensated Flow Control Valve Drawing No. EPN1381–1 dated Sep. 24, 1987.

*Primary Examiner*—Stephen M. Hepperle
*Attorney, Agent, or Firm*—Emch, Schaffer, Schaub & Porcello, Co., L.P.A.

[57] ABSTRACT

A fluid flow control valve and method for operating which maintains the rate of flow of fluid therethrough at a substantially constant rate regardless of variations in pressure of the fluid flowing therethrough.

23 Claims, 4 Drawing Sheets

5,878,766

PRESSURE COMPENSATED FLOW CONTROL VALVE

This application claims benefit of USC Provisional Appln. No. 60/056,817 filed Aug. 22, 1997.

BACKGROUND OF THE INVENTION

The present application is directed to a pressure compensated flow control valve which is fully adjustable and which is provided with reverse flow check. It is designed to provide adjustable flow rate to hydraulic systems or to actuators and to maintain the flow rate as adjusted constant within a small range regardless of variations of the system pressure or the actuator load. The valve also provides free flow in the opposite direction and is one which may be readily installed in a fluid flow system without the necessity of disassembling components of the valve.

Prior art valves of this type have designs which require parts with extremely tight tolerances with respect to size and shape of the various parts. In many prior art valves, the tolerances are so tight as to require special machine tools for their manufacture. This results in very high costs for these types of valves.

The valve of the present invention is one which is designed to utilize a minimum number of parts and has a design which does not require that the parts be manufactured to the extremely tight tolerances required in the prior art.

IN THE DRAWINGS

DETAILED DESCRIPTION OF THE INVENTION

Figure 1:
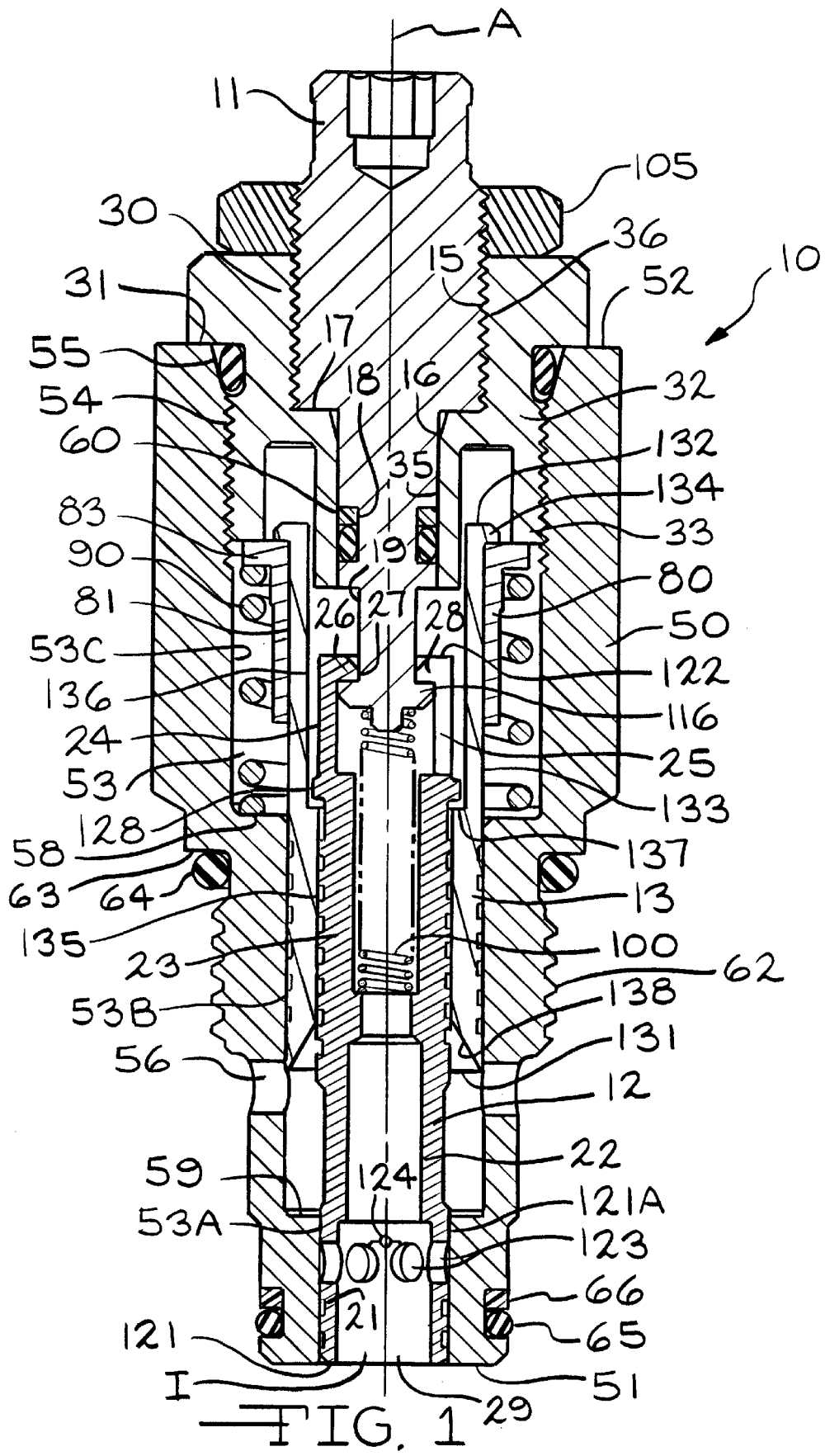
FIG. 1 is a sectional view of the flow control valve of the present invention with the parts adjusted such that the valve is closed.

Referring to the drawings, there is shown a valve generally designated by the numeral 10 which includes a retainer 50 extending along an axis A from an inlet end 51 to an opposing end 52. A central passageway 53 extends from the inlet end 51 to the opposing end 52. The passageway 53 is defined by a first inwardly facing cylindrical wall surface 53A having a first diameter of predetermined size and extending inwardly from the inlet end 51, a second inwardly facing cylindrical wall surface 53B having a larger diameter and a third inwardly facing cylindrical wall surface 53C having a still larger diameter. The retainer 50 has an inwardly facing threaded portion 54, which extends axially from the third inwardly facing cylindrical wall surface 53C to a position spaced a short distance from the opposing end 52. A chamfer 55 flares outwardly from the threaded portion 54 to the opposing end 52. A plurality, preferably four, of outlet ports 56 extend through the wall of the retainer 50 in the area of the second inwardly facing cylindrical wall surface 53B. A radial shoulder 58 joins the second inwardly facing wall surface 53B to the third inwardly facing wall surface 53C. A radial shoulder 59 joins the first inwardly facing wall surface 53A to the second inwardly facing wall surface 53B.

Externally the retainer 50 is provided with outwardly facing threads 62 for connecting the valve 10 in a fluid flow system (not shown). An outwardly extending shoulder 63 defines one side of a recess in which is positioned an O-ring 64. The retainer also has an outwardly facing annular groove adjacent the inlet end 51 in which are positioned an annular sealing ring 65 and a rigid or semi-rigid back-up ring 66.

Received in the passageway 53 are an inner spool 12, an outer compensator spool 13, a sleeve 80, a cap 30 and an adjusting screw 11.

The inner spool 12 extends from a first end 121 defining an inlet port I in the vicinity of the retainer inlet end 51 to a second end 122 located axially in the area of the third inwardly facing cylindrical wall surface 53C.

The inner spool 12 has a first section 21 sized to be slideably engaged to the first inwardly facing cylindrical wall surface 53A of the retainer 50, a second section 22 which is slightly smaller both internally and externally than the first section 21, and a third section 23 which extends axially to a recessed area 127. An outwardly extending flange 128 is beyond the recessed area 127. On the opposite side of the flange 128 is a wall section 24 which extends axially to the second end 122 and extends circumferentially substantially less than 360° leaving an opening defined by opposing edges 25. A flange 26 extends radially inwardly from the wall section 24. The inner edge of the flange defines an aperture 27 and a slot 28 permitting entry to the aperture 27. An axial passageway 29 extends from the first end 121 to a point axially beyond the flange 128 to communicate with the opening defined by the opposing edges 25.

The inner spool 12 is moveable axially from the extended position shown in FIG. 1 to a retracted position at which the first end 121 is spaced inwardly from the inlet end 51 of the retainer 50. (See FIG. 2). A plurality of holes 123, preferably six in number, extend through the first section 21 of the inner spool 12. The size of each of the holes 123 should be sufficient to permit a free flow of fluid therethrough from the inlet port I when the inner spool 12 is axially positioned such that the holes 123 are in the fully open position. The holes 123 are fully opened when the spool is retracted to a position such that all portions of such holes 123 are aligned with the second inwardly facing wall surface 53B and no portions are aligned with the first inwardly facing wall surface 53A. For example, if the inlet port I is ¼ inch, the diameter of each of the holes 123 could be in the range of 0.1 inch ±0.010 inch and the diameter of the ports 56 of the retainer 50 could be 0.123 inch. There is additionally provided two small apertures 124 extending through the first section 21 of the inner spool 12 in an area axially aligned with the portion of the holes 123 spaced the furthest axially from the first end 121. The apertures 124 may have a diameter of 0.031 inch and are spaced 180° apart.

Encircling that portion of the inner spool 12 from the third section 23 to the second end 122 is an outer spool 13 which functions as a compensator spool. The outer spool 13 extends axially from a first end 131 to a second end 132 and has a generally cylindrical outer wall surface 133 slideably engaged with the second inwardly facing wall surface 53B of the retainer 50. A major portion of the outer spool 13 extends axially beyond the second inwardly facing cylindrical wall surface 53B and is axially aligned with but spaced radially inwardly from the third inwardly facing cylindrical wall surface 53C of the retainer 50. The outer spool has an outwardly extending flange 134 at its second end 132.

The outer spool 13 has a first inwardly facing cylindrical wall surface 135 sized to receive the inner spool 12 in sliding engagement therewith and a second, slightly larger inwardly facing cylindrical wall surface 136 extending from the first inwardly facing cylindrical wall surface 135 to the second end 132. A radial shoulder 137 joins the first inwardly facing wall surface 135 to the second inwardly facing wall surface 136.

Encircling the portion of the outer spool 13 in the area adjacent the flange 134 is a sleeve 80 having an inwardly facing wall surface 81 slideably engaged to the outer surface of the outer spool 13. The sleeve 80 has an engagement end with a flange 83 extending radially outwardly therefrom. The sleeve engagement end engages the flange 134 of the outer spool 13.

A helical spring 90 is positioned between the flange 83 of the sleeve 80 and the shoulder 58 of the retainer 50 and yieldingly urges the sleeve 80 and outer spool 13 toward the opposing end 52 of the retainer 50.

Threadedly engaged to the threaded portion 54 of the retainer 50 is a cap 30. The cap 30 is provided with a radial flange 31 which rests upon the second end 52 of the retainer 50. Extending inwardly into the retainer 50 from the flange 31 is an intermediate section 32 from which extends an outer wall 33 and an inner wall 34 spaced therefrom. The outer wall 33 has outwardly facing threads which engage the threaded portion 54 of the retainer 50. The portion of the cap 30 intermediate section 32 adjacent the flange 31 is recessed slightly and cooperates with the chamfer 55 to provide a cavity in which is positioned an O-ring 40 which is sealingly compressed between the cap 30 and the retainer 50 when the cap is engaged. The inner wall 34 extends axially a short distance into the outer spool 13 at the second end 132 and terminates at end 38. The inner wall 34 has an inwardly facing cylindrical wall surface 35. The cap 30 has inwardly facing threads 36 extending from the end 37.

Threadedly engaged to the threads 36 of the cap 30 is an adjusting screw 11. The adjusting screw 11 includes a first section having outwardly facing threads 15 engageable with the threads 36 and a second smaller section having an outwardly facing cylindrical wall surface 16 sized to slideably engage the inwardly facing wall surface 35 of the cap 30. A shoulder 17 is provided between the first and second sections. The second section is provided with an annular groove 18 in which is positioned a backup washer 60 and an O-ring 70 which sealingly engages the inwardly facing wall surface 35. Extending downwardly from the second section is a probe 19 having a cylindrical portion received within the opening 27 at the second end 122 of the inner spool 12. The probe 19 has an outwardly extending flange 116 engaged to the flange 26 of the inner spool 12 and a nose 117. A second spring 100 is positioned in the inner spool 12 and extends from the flange 116 of the probe 19 to a radially inwardly directed shoulder 129 of the inner spool 12 and yieldingly urges the inner spool 12 toward the inlet end 51 of the retainer.

A nut 105 is engaged to the threads 15 of the adjusting screw 11 and abuts the end 37 of the cap 30 to lock the adjusting screw 11 in position following its axial adjustment to the desired position.

The outer spool 13 has a chamfer 138 at the first end 131 tapering inwardly from the outer surface toward the inner surface. The outer spool 13 is yielding urged toward the second end 52 of the retainer 50 by the spring 90 which is positioned in the cavity defined by the enlarged portion of the passageway 53 defined by inwardly facing wall surface 53C and the outer spool 13 and sleeve 80 engaged thereto. The spring 90 has one end engaged to the shoulder 58 of the retainer 50 and the other end engaged to the flange 83 of the sleeve. Urging of the sleeve 80 is translated to the outer spool 13 by engagement of the sleeve flange 83 with the flange 134 of the outer spool 13.

The inner spool 12 is yieldingly urged away from the adjusting screw 10 and second end 52 of the retainer 50 by means of spring 100 which extends between the flange 116 of adjusting screw probe 19 and shoulder 129. Engagement of the flange 26 against the flange 116 of the adjusting screw probe 19 limits the extent to which the inner spool 12 can be urged away from the shoulder 17 of the adjusting screw 11. Movement of the inner spool 12 toward the second end 52 of the retainer 50 is limited by the end 38 of the inner wall 34 of cap 30. In its maximum retracted position toward the second end 52 of the retainer 50, the second end 122 and flange 26 of the inner spool 12 will engage the end 38 of the wall 34.

Figure 2:
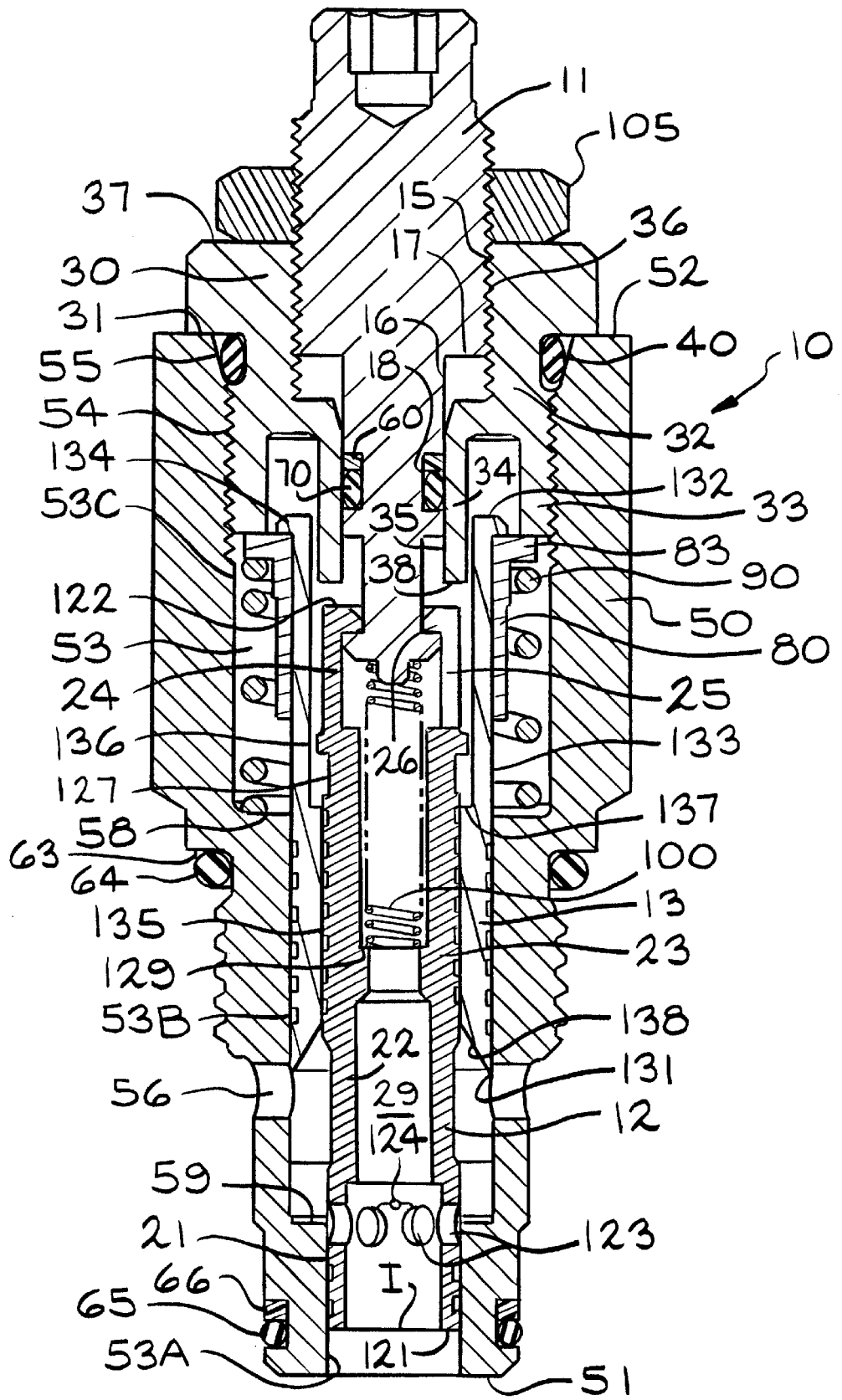
FIG. 2 is a view similar to FIG. 1 showing the valve in an open position to a predetermined flow rate which is less than the maximum flow rate of the valve.
Figure 3:
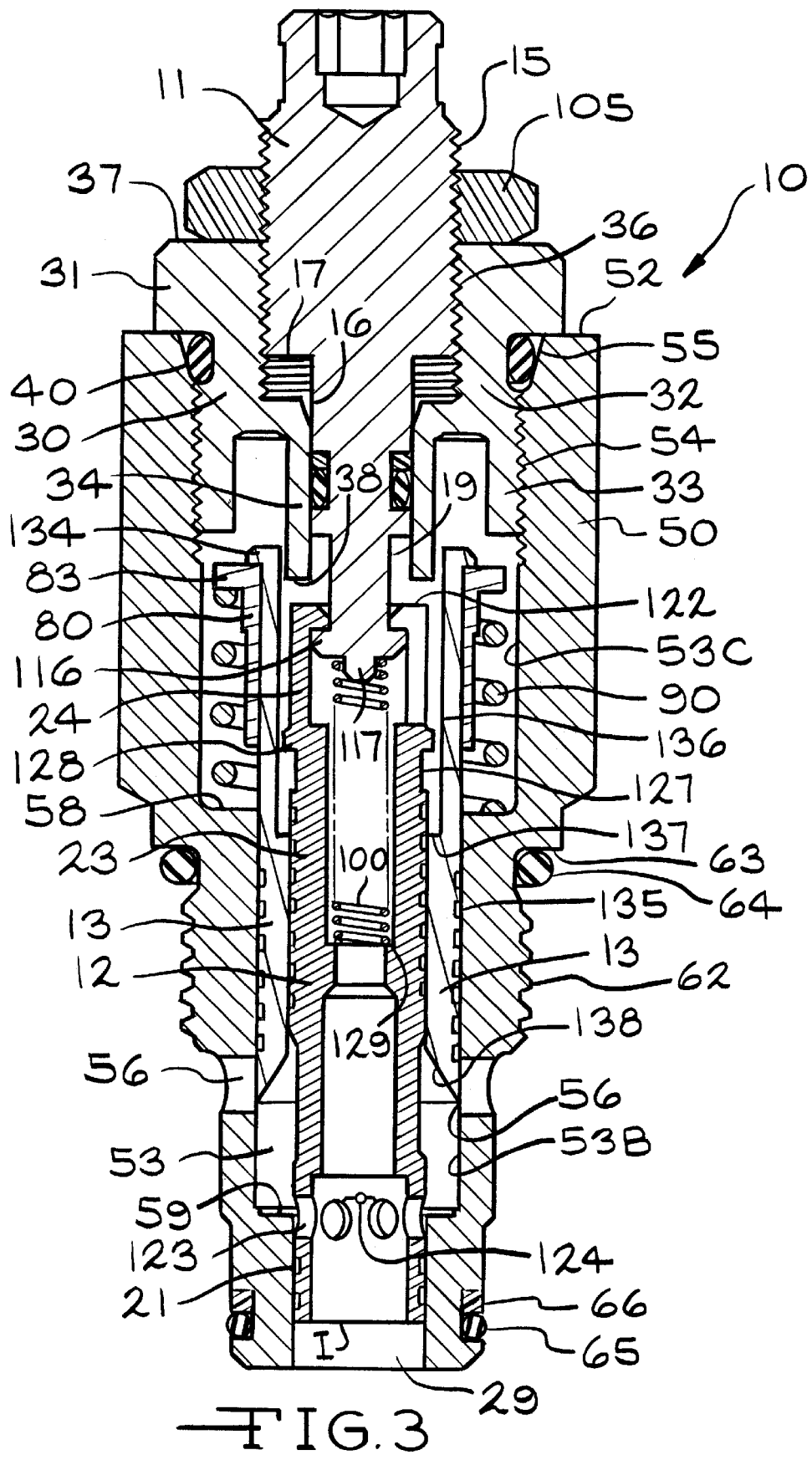
FIG. 3 is a view similar to FIGS. 1 and 2 showing the compensator spool moved to a position partially overlying the outlet holes.
Figure 4:
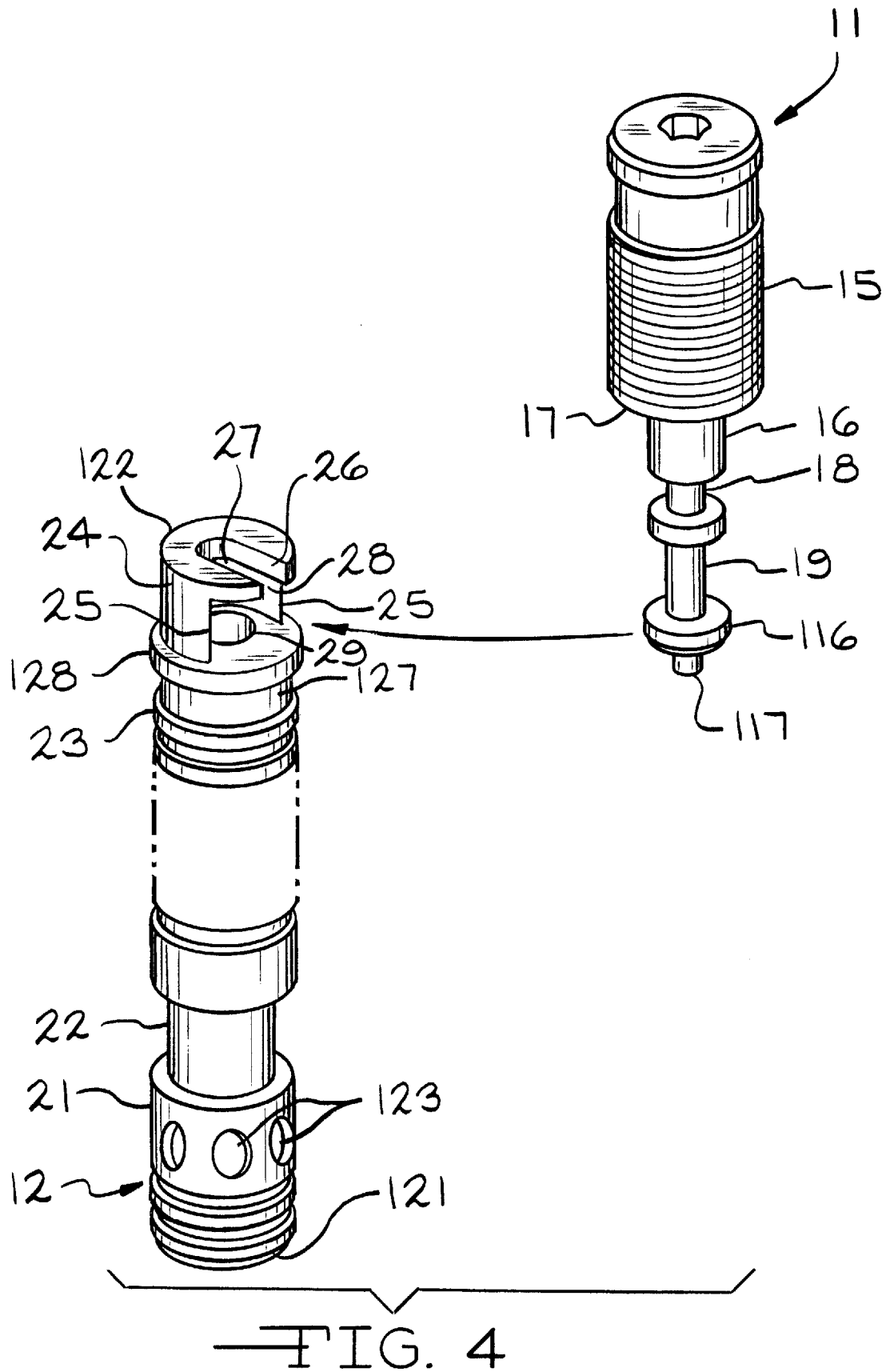
FIG. 4 is an exploded perspective showing the inner spool and the adjusting screw.

FIG. 1 shows the valve 10 of the present invention in the fully closed position. Upon rotation of the adjusting screw 11 in a counter-clockwise direction, the adjusting screw will retract causing the inner spool 12 to be pulled toward the second end 52 of the retainer 50 by means of the flange 116 at the end of probe 19 engaging the inwardly directed flange 26 of the inner spool 12. In order to provide a specific flow rate through the valve from the inlet I defined by the open end 121 of the inner spool 12 to the outlets 56 of the retainer 50, the inner spool 12 is moved to a position at which the apertures 124 and the holes 123 are at least partially aligned with the enlarged second inwardly facing wall surface 53B of the retainer 50. As shown in FIGS. 2 and 3, as an example, the holes 123 are still partially aligned with the reduced size, first inwardly facing wall surface 53A and apertures 124 are aligned with the enlarged second inwardly facing wall surface 53B of the retainer 50.

The apertures 124 are sized to provide a small flow rate, on order of approximately 0.25 gallons per minute (GPM). The shoulder 59, the holes 123 and the apertures 124 are designed with sharp edges to minimize flow variation with viscosity changes. The degree of exposure of the holes 123 and apertures 124 to the enlarged open area defined by the enlarged second inwardly facing surface 53B above shoulder 59 defines a first throttling area and sets up restriction which determines the flow rate therethrough. Such adjustment of the adjusting screw 11 in defining the first throttling area thereby establishes the desired flow rate.

As the flow of fluid to be regulated enters the valve through the inlet port I defined by the open end 121 of the inner spool 12, it passes through the first throttling area defined by the holes 123 and apertures 124 to the extent that such holes 123 are aligned with the second inwardly facing wall surface 53B and, thus, open for flow at the desired flow rate. Flow of fluid through such first throttling area causes a pressure drop creating an operating force which acts on outer spool 13 to move such outer spool 13 toward the inlet end 51 to a position partially closing ports 56. Such partial closure of ports 56 results in a constant rate of flow of fluid through the enlarged area defined by the enlarged second inwardly facing surface 53B and out of the outlet ports 56 regardless of variations in the pressure to which the fluid in the system is subjected.

The manner in which the operating force caused by the pressure drop acts to move the outer spool 13 will now be described. As previously described, the spring 90 yielding urges the outer spool 13 toward the retainer second end 52 to a fully open, retracted position with its lower edge 131 above the outlet ports 56. As can be seen in the drawings, the inlet port I defined by the open end 121 is hydraulically connected to the second end 132 of the outer spool 13 by means of fluid paths through the passageway 29 of the inner spool 12, around the spring 100, past the opening defined by the opposing edges 25, through the gap between the outer surface of the inner wall 34 of cap 30 and inner surface of the outer spool 13 in the area adjacent the second end 132.

As the flow of fluid to be regulated enters the inlet port I, there is a predetermined pressure drop through the sharp edged first throttling area defined by the degree of exposure of the holes 123 and apertures 124 to the enlarged second inwardly facing surface 53B. The pressure drop is created by the restriction corresponding with the open area of the holes 123 and apertures 124 aligned with the inwardly facing wall surface portion 53B. The pressure drop equals the pressure at the second end 132 of the outer spool 13 (the pressure in port I before first throttling area) minus the pressure in the cavity defined by the enlarged inwardly facing wall surface 53B and the outer surface of the inner spool 12 aligned therewith. The predetermined pressure drop equals the force of the spring 90 divided by the working area of the outer spool 13. The working area equals the area of cylindrical outer wall surface 133 minus the area of the first inwardly facing cylindrical wall surface 135. If the flow rate tries to exceed the desired flow rate (corresponding with the rate of flow at the first throttling area as determined by adjustment of the adjusting screw 11), the pressure drop will increase and the pressure on the second end 132 of the outer spool 13 will increase. This increase in pressure on the second end 132 will unbalance the forces and cause the outer spool 13 to move toward the inlet end 121 whenever the effective force on such second end 132 offsets the spring force of spring 90. Such movement will cause the first end 131 of the outer spool 13 to partially close the outlet ports 56 and to decrease a second throttling area defined by the open part of outlet ports 56 thereby increasing the pressure inside the passageway 53 of the retainer 50 after the first throttling area and keeping the pressure drop and, therefore, the flow rate constant. Such motion to restrict the size of available opening of the ports 56 to the flow of fluid will continue until the system relief valve opens and excess flow returns to the tank over the system relief valve (not shown).

As can be seen from the foregoing, variations of flow through the first throttling area and variations of the upstream or the downstream pressure unbalance forces on the outer spool 13 and cause movement of such outer spool 13 to correct automatically for any variations in pressure by increasing or decreasing the second throttling area as required. As a result a constant flow rate is maintained regardless of variations of upstream or downstream pressure provided the upstream pressure is greater than the downstream pressure by the predetermined pressure drop through the first throttling area corresponding with the force of the spring 90 divided by the working area of the outer spool 13.

If fluid is flowing in the reverse direction from the ports 56 toward the open end 121 of inner spool 12, pressure acts on the lower end 131 of the outer spool 13 and pushes it toward the end 52 of the retainer 50. Such movement of the outer spool 13 causes the radial shoulder 137 of the outer spool 13 to push against flange 128 and move the inner spool 12 in the same direction against spring 100 to open the first throttling area fully regardless whether it was partially opened or closed upon initial adjustment of adjusting screw 11. It provides free reverse flow from the outlet ports 56 to what is normally the inlet Port I.

Many modifications will become readily apparent to those skilled in the art. Accordingly, the scope of the present patent application should be determined only by the scope of the claims.

I claim:

1. A flow control valve comprising:
   (a) a retainer extending along an axis from a fluid flow open end to a second end and having a first inwardly facing cylindrical wall surface at said open end and a second larger inwardly facing cylindrical wall surface, said retainer having a radial port extending outwardly from said second wall surface;
   (b) an inner spool extending along said axis from an inlet end to an opposing end mounted for axial movement in said retainer, said inner spool having (i) an axial passageway, (ii) a first section slideably engaged to said retainer first wall surface, (iii) a second section having an outwardly facing cylindrical wall, (iv) a radial flange positioned axially between said second section and said opposing end, (v) a first radial opening of predetermined size within said first section and (vi) a second radial opening within said first section having a size smaller than said first radial opening and axially positioned such that upon axial movement of said inner spool toward said retainer second end, said second radial opening will become aligned with said retainer second wall surface prior to or substantially simultaneously with said first radial opening becoming so aligned;
   (c) an outer spool extending along said axis from a first end to a second end positioned for axial movement in said retainer, said outer spool having an area adjacent said first end slideably engaged (i) to said retainer second wall surface and operable to close said radial port when aligned therewith and (ii) to said inner spool second section outwardly facing cylindrical wall, said outer spool having a shoulder engageable with said inner spool radial flange;
   (d) a stop member for limiting the maximum axial extent to which said inner spool may extend toward said retainer open end; and
   (e) a spring yieldingly urging said outer spool away from said retainer open end.

2. The flow control valve according to claim 1 wherein an increase in pressure of fluid flowing into the inlet end of the inner spool is transmitted to the second end of said outer spool thereby urging said outer spool toward said retainer open end against the urging action of said spring to at least partially close said radial port.

3. The flow control valve according to claim 1 further including a compression spring yieldingly urging said inner spool toward said retainer open end wherein flow of fluid from said radial port toward said inlet urges said outer spool away from said retainer open end, said outer spool shoulder engaging said inner spool flange thereby causing said inner spool to move therewith against the urging of said compression spring.

4. The flow control valve according to claim 1 further including a cap engaged to said retainer second end, said cap having an outer wall portion including an end limiting the extent to which said spring can urge said outer spool away from said retainer open end.

5. The flow control valve according to claim 1 further including an adjuster associated with said stop member for varying said maximum axial extent.

6. The flow control valve according to claim 5 further including a cap engaged to said retainer second end, said cap having a central wall portion defining an axially extending passage, said adjuster having a stem extending through said passage and engaged to said inner spool.

7. The flow control valve according to claim 6 wherein said adjuster is threadedly engaged to said cap and includes a flange extending outwardly from said stem, said flange engaging said inner spool.

8. The flow control valve according to claim 6 further including a compression spring yieldingly urging said inner spool toward said retainer open end.

9. The flow control valve according to claim 6 wherein said adjuster is threadedly engaged to said cap and includes a flange extending outwardly from said stem, said flange engaging said inner spool and further including a compression spring engaged to said flange yieldingly urging said inner spool toward said retainer open end.

10. The flow control valve according to claim 1 wherein said outer spool has an outwardly extending flange in the area of said second end and further including a sleeve encircling said outer spool in slideable relationship therewith and engageable with said outwardly extending flange, said sleeve having a radial protrusion engaged by said spring.

11. A method for maintaining the rate of flow of a fluid through a system having a fluid flow line substantially constant irrespective of variations of pressure in the system comprising the steps of:

(a) positioning a valve in said fluid flow line, said valve having an inlet for receiving fluid from a first portion of said fluid flow line and an outlet for discharging fluid to a second portion of said fluid flow line, said valve including (i) a retainer extending along an axis from a fluid flow open end to a second end, said retainer having a first inwardly facing cylindrical wall surface of a fixed diameter, a second inwardly facing cylindrical wall surface of larger diameter than said first wall surface and a radial port extending outwardly from said second wall surface; (ii) an inner spool extending along said axis from an inlet end to an opposing end mounted in said retainer, said inner spool having an axial passageway and including a first section engaged to said retainer first wall surface and a second section having an outwardly facing cylindrical wall, a first radial opening of predetermined size within said first section and a second radial opening within said first section having a size smaller than said first radial opening and axially positioned with, said second radial opening aligned with said retainer second wall surface and said first radial opening at least partially aligned with said retainer second surface; (iii) an outer spool extending along said axis from a first end to a second end positioned for axial movement in said retainer, said outer spool in the area adjacent said first end being slideably engaged (A) to said retainer second wall surface and operable to close said radial port when aligned therewith and (B) to said inner spool in an area axially spaced from said inlet;

(b) yieldingly urging, with a force of predetermined magnitude, said outer spool away from said retainer inlet end to a position at which said radial port is open; and (c) while said fluid is flowing into said inlet and out of said radial port, causing fluid to flow through said inner spool axial passageway to said outer spool second end creating an axial force against said second end, said axial force, upon reaching a magnitude overcoming said force of yieldingly urging, moving said outer spool axially to a position at least partially overlying said radial port.

12. The method according to claim 11 further including the step of providing a spring for urging said outer spool away from said retainer open end and limiting the extent to which said spring can urge said outer spool away from said retainer open end.

13. The method according to claim 11 further including the step of axially adjusting the position of said inner spool in said retainer.

14. A method for maintaining the rate of flow of a fluid through a system having a fluid flow line substantially constant irrespective of variations of pressure in the system comprising the steps of:

(a) positioning a valve in said fluid flow line, said valve having an inlet for receiving fluid from a first portion of said fluid flow line and an outlet for discharging fluid to a second portion of said fluid flow line, said valve including (i) a retainer extending along an axis from a fluid flow open end to a second end, said retainer having a first inwardly facing cylindrical wall surface of a fixed diameter, a second inwardly facing cylindrical wall surface of larger diameter than said first wall surface and a radial port extending outwardly from said second wall surface; (ii) an inner spool extending along said axis from an inlet end to an opposing end mounted in for axial movement in said retainer, said inner spool having an axial passageway and including a first section slideably engaged to said retainer first wall surface, a second section having an outwardly facing cylindrical wall and a radial flange positioned axially between said second section and said opposing end, a first radial opening of predetermined size within said first section and a second radial opening within said first section having a size smaller than said first radial opening and axially positioned such that upon axial movement of said inner spool toward said retainer second end, said second radial opening will become aligned with said retainer second wall surface prior to or substantially simultaneously with said first radial opening become so aligned; (iii) an outer spool extending along said axis from a first end to a second end positioned for axial movement in said retainer, said outer spool in the area adjacent said first end being slideably engaged (A) to said retainer second wall surface and operable to close said radial port when aligned therewith and (B) to said inner spool in an area axially spaced from outlet;

(b) yieldingly urging said inner spool toward said retainer inlet end and axially adjusting said inner spool to a position at which said second radial opening is aligned with said retainer second wall surface and said first radial opening is at least partially aligned with said retainer second wall surface;

(c) yieldingly urging, with a force of predetermined magnitude, said outer spool away from said retainer inlet end to a position at which said radial port is open;

(d) while said fluid is flowing into said inlet and out of said radial port, causing fluid to flow through said inner spool axial passageway to said outer spool second end creating an axial force against said second end, said axial force, upon reaching a magnitude overcoming said force of yieldingly urging, moving said outer spool axially to a position at least partially overlying said retainer radial port; and (e) while said fluid is flowing into said radial port and out of said inlet, said fluid urging said outer spool away from said retainer inlet end and causing said outer spool to engage and move said inner spool axially away from said retainer inlet.

15. The method according to claim 14 further including the step of providing a spring for urging said outer spool away from said retainer open end and limiting the extent to which said spring can urge said outer spool away from said retainer open end.

16. The method according to claim 14 further including the step of axially adjusting the maximum extent to which said inner spool can be urged toward said retainer open end.

17. A flow control valve comprising:
   (a) a retainer extending along an axis from a fluid flow open end to a second end and having a first inwardly facing cylindrical wall surface at said open end and a second larger inwardly facing cylindrical wall surface, said retainer having a radial port extending outwardly from said second wall surface;
   (b) an inner spool extending along said axis from an inlet end to an opposing end mounted for axial movement in said retainer, said inner spool having (i) an axial passageway, (ii) a first section slideably engaged to said retainer first wall surface, (iii) a second section having an outwardly facing cylindrical wall, (iv) a radial flange positioned axially between said second section and said opposing end, (v) a first radial opening of predetermined size within said first section and a second radial opening within said first section having a size smaller than said first radial opening and axially positioned such that upon axial movement of said inner spool toward said retainer second end, said second radial opening will become aligned with said retainer second wall surface prior to or substantially simultaneously with said first radial opening become so aligned;
   (c) an outer spool extending along said axis from a first end to a second end positioned for axial movement in said retainer, said outer spool having an area adjacent said first end slideably engaged (i) to said retainer second wall surface and operable to close said radial port when aligned therewith and (ii) to said inner spool second section outwardly facing cylindrical wall, said outer spool having a shoulder engageable with said inner spool radial flange;
   (d) an adjuster for setting the maximum axial extent to which said inner spool may extend toward said retainer open end;
   (e) a first spring yieldingly urging said inner spool toward said retainer open end; and
   (f) a second spring yieldingly urging said outer spool away from said retainer open end.

18. The flow control valve according to claim 17 wherein an increase in pressure of fluid flowing into the inlet end of the inner spool is transmitted to the second end of said outer spool thereby urging said outer spool toward said retainer open end against the urging action of said second spring to at least partially close said radial port.

19. The flow control valve according to claim 17 wherein flow of fluid from said radial port toward said inlet urges said outer spool away from said retainer open end, said outer spool shoulder engaging said inner spool flange causing said inner spool to move therewith against the urging of said second spring upon said outer spool.

20. The flow control valve according to claim 17 further including a cap engaged to said retainer second end, said cap having an outer wall portion including an end limiting the extent to which said second spring can urge said outer spool away from said retainer open end.

21. The flow control valve according to claim 17 further including a cap engaged to said retainer second end, said cap having a central wall portion defining an axially extending passage, said adjuster having a stem extending through said passage and engaged to said inner spool.

22. The flow control valve according to claim 21 wherein said adjuster is threadedly engaged to said cap and includes a flange extending outwardly from said stem, said flange engaging said inner spool.

23. The flow control valve according to claim 17 wherein said outer spool has an outwardly extending flange in the area of said second end and further including a sleeve encircling said outer spool in slideable relationship therewith and engageable with said outwardly extending flange, said sleeve having a radial protrusion engaged by said second spring.

* * * * *